United States Patent [19]

Higashida et al.

[11] 3,767,866

[45] Oct. 23, 1973

[54] TAKE-UP DEVICE FOR MAGNETIC TAPE DUPLICATING SYSTEM

[75] Inventors: Yutaka Higashida, Nishinomiya; Kaoru Imanishi, Neyagawa; Nobushige Kouriki, Katano; Sadao Mizuno, Neyagawa, all of Japan

[73] Assignee: Matsushita Electric Industrial Co., Ltd., Osaka, Japan

[22] Filed: Apr. 6, 1972

[21] Appl. No.: 241,578

[30] Foreign Application Priority Data

Apr. 9, 1971 Japan ............................... 46/27307
Sept. 9, 1971 Japan ............................... 46/82087
Nov. 12, 1971 Japan ............................. 46/106224

[52] U.S. Cl. ........................................... 179/100.2 E
[51] Int. Cl. ........................................... G11b 15/60
[58] Field of Search ............................ 179/100.2 E; 226/184

[56] References Cited

UNITED STATES PATENTS

| | | | |
|---|---|---|---|
| 3,676,612 | 7/1972 | Kobayashi et al. | 179/100.2 E |
| 2,927,972 | 3/1960 | Del Valle | 226/184 |
| 3,627,917 | 12/1971 | Sugaya et al. | 179/100.2 E |

*Primary Examiner*—Terrell W. Fears
*Assistant Examiner*—Robert S. Tupper
*Attorney*—Richard K. Stevens et al.

[57] ABSTRACT

A magnetic tape duplicating system where a master tape carrying recorded information and a slave tape are taken up on the same take-up reel with the magnetic faces of said tapes in contact with each other for impressing a transfer field on said tapes in the taken-up state, said system comprising a take-up reel without flange, both said tapes being concurrently taken up on said take-up reel, and a tape driven means having at least one flange and provided with a peripheral resilient ring, both said tapes being passed round said tape drive means for a portion of the periphery of said drive means subtending a predetermined angle, both said tapes being pressed against the periphery of said drive means, said tapes being adapted to be brought into contact with said flange, whereby excellent alignment of the lower edges of said tapes may be obtained to provide for increased fidelity of duplication.

9 Claims, 15 Drawing Figures

TAKE-UP DEVICE FOR MAGNETIC TAPE DUPLICATING SYSTEM

This invention relates to magnetic tape duplicating systems and, more particularly, to systems for transferring such information as video signals recorded on a master tape to a slave tape. More specifically, the invention is concerned with magnetic tape duplicating systems where a master tape carrying recorded information and a slave tape are taken up on the same take-up reel with the magnetic faces of said tapes in contact with each other for impressing a transfer field on said tapes in the taken-up state to thereby transfer information from the master tape to the slave tape.

In the magnetic tape duplicating system where the master tape and slave tape are taken up concurrently, the alignment of the taken-up tapes at the time of impressing a transfer field is very important.

To obtain fidelity transfer with these systems, therefore, both the steps should be taken up such that the lower edges of the taken-up tapes are flush. (According to EIAJ the record pattern of record tapes in the magnetic video recorder should be based on the lower edge of the travelling tape.)

It is an object of the invention, accordingly, to provide a magnetic tape duplicating system, in which excellent edge alignment of the master and slave tapes is obtained to permit fidelity transfer of information from master tape to slave tape.

The magnetic tape duplicating system according to the invention comprises a take-up reel without flange on which both the master and slave tapes are concurrently taken up, and a tape drive means which is provided either on one side or on both sides with a flange and with a resilient ring on the periphery. Both the tapes are passed round the tape drive means for a portion thereof subtending a predetermined angle.

In accordance with the invention, means are provided to render the state of forced contact between the tape drive means and the tapes such that a pressure gradient is established in the vertical direction of the contact area of said tapes so as to bring the tapes into contact with the lower flange of said tape drive means, or the resilient ring is so arranged or contoured as to obtain the same effects, or as a further alternative position regulating guide posts may be provided to guide the tapes such that they reach the tape drive means with the lower edge of the tape engaging the lower flange while the take-up reel is urged against the lower flange of the tape drive means, whereby excellent alignment of lower edges of both the tapes may be obtained to realize fidelity duplication of the master tape.

In order for the invention to be fully understood, it will now be described in connection with the accompanying drawings, in which.

Figure 8A:
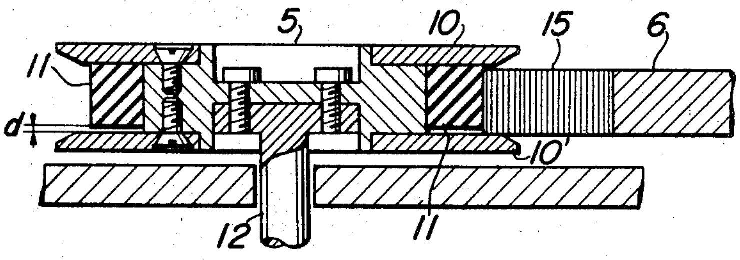
Figure 8B:
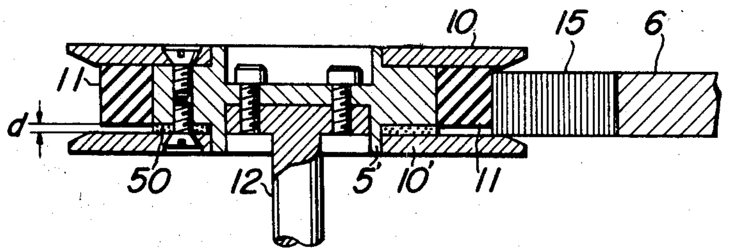
Figure 9:
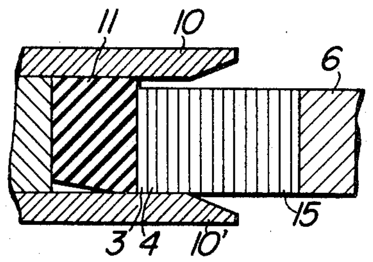
Figure 10:
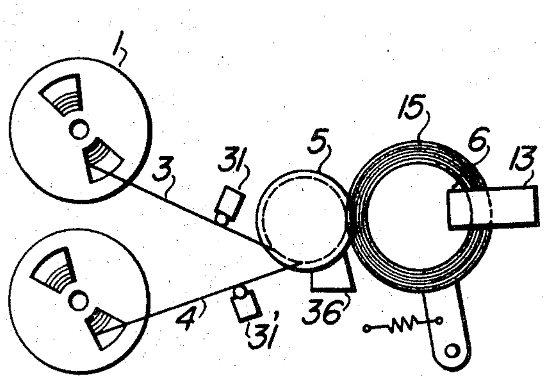
Figure 11:
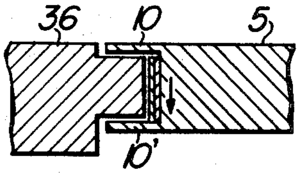
Figure 12:
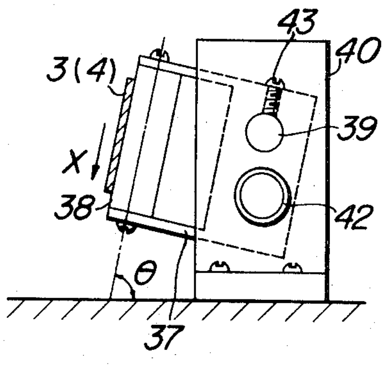
Figure 14:
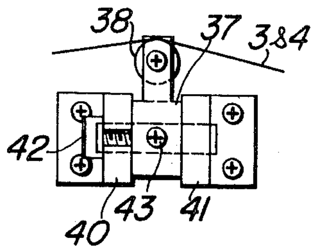
Figure 13:
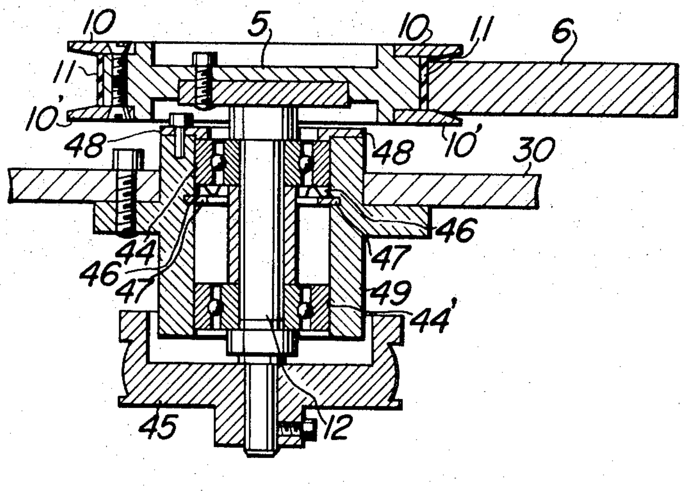

FIGS. 8*a* and 8*b* are fragmentary sectional views showing further embodiments of the invention;

FIG. 9 is a fragmentary sectional view to illustrate the mechanisms of FIGS. 8a and 8b;

FIG. 10 is a schematic representation of a still further embodiment of the invention;

FIG. 11 is a fragmentary sectional view to illustrate the operation of the mechanism of FIG. 10;

FIGS. 12 and 14 show tape edge position regulating means used in the embodiment of FIG. 10; and FIG. 13 is a fragmentary sectional view showing details of a part of the embodiment of the invention shown in FIG. 10.

Figure 1:
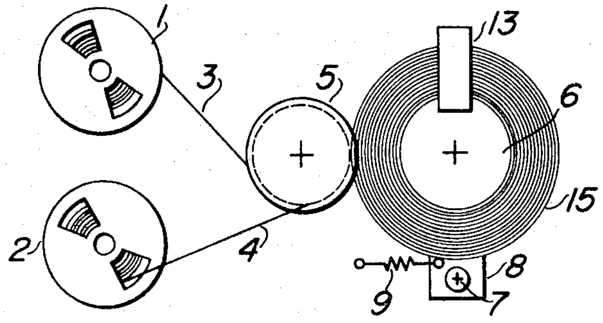
FIG. 1 is a schematic representation of a magnetic tape duplicating system embodying the invention.

Referring to FIG. 1, numerals 1 and 2 designate master tape and slave tape reels. A master tape 3 carrying information recorded thereon and a slave tape 4 proceeding from the respective reels 1 and 2 are passed round a guide roller 5 with the magnetic faces of both tapes brought into contact with each other to be taken up concurrently on a take-up reel 6. At the guide roller 2, the transversal position of the tapes is regulated, that is, the lower edges of the tapes are brought into contact with a lower flange provided to the guide roller 6 by an arrangement to be described hereinafter.

The take-up reel 6 has no flange, and is rotatably mounted on a pivotal arm 8 pivoted at a support pin 7. The arm 8 is spring biased by a spring 9 such that the roll of tapes being taken up on the take-up reel 6 is brought into forced contact with the guide roller 5. Thus, the guide roller 5 serves as capstan and the tape roll as pinch roller, thus providing a tape drive and also ensuring excellent close contact between both the tapes.

Numeral 13 designates transfer field source means, which is disposed above or below a roll 15 of tapes taken up on the take-up reel 6. The transfer field set up by the source means 13 is thus impressed on the tape roll 15.

The arrangement for regulating the transversal tape position as mentioned above will now be described in detail.

Figure 2:
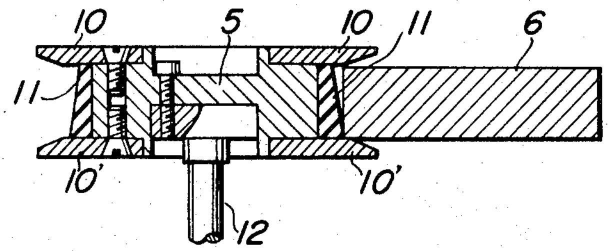
FIG. 2 is a sectional view showing an embodiment of the tape edge position regulating mechanism, according to the invention.

FIG. 2 shows one such arrangement embodying the invention. Referring to the Figure, the guide roller or capstan 5 is provided with upper and lower flanges 10 and 10′ spaced from each other by a distance slightly greater than the width of both the master and slave tapes 3 and 4. Provided within the groove defined by these flanges is a resilient tapered ring 11 of such resilient material as rubber of synthetic resin. It is tapered toward the upper flange 10.

Numeral 12 designated a drive shaft of the capstan 5, and it is driven from a drive source such as motor.

The tapes 3 and 4 are driven by virtue of the forced contact between the capstan 5 and the tape roll on the take-up reel 6 urging the tape roll against the periphery of the capstan 5, whereby they are taken up on the take-up reel 6.

Figure 3:
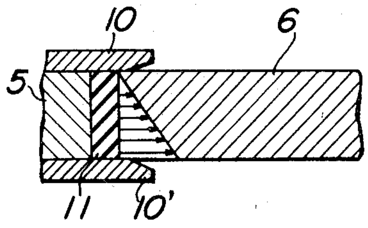
FIG. 3 is a fragmentary sectional view to illustrate the operation of the mechanism of FIG. 2.

With the above construction, as the overlapping tapes being taken up are pressed against the tapered resilient ring 11 fitted on the roller capstan periphery, a pressure gradient is established in the transversal direction of that tape portion which is in contact with the ring 11, since the ring 11 is deformed by the urging force transmitted to it from the take-up reel 6, as is illustrated in FIG. 3.

The tapes urging the ring 11 thus experiences reaction force. The reaction force exerted on the tapes is greater for tape portions nearer to the lower edge of the tapes (that is, nearer to the flange 10'), so that a tape run in contact with the resilient ring 11 experience a resultant downward force. As a result, the lower edges of both the tapes are brought into contact with the flange 10', and are thus aligned.

In the above manner, by aligning both the tapes to be taken up, it is possible to impress a transfer field on the roll of aligned tapes. It will be noted that to this end the capstan 5 may be provided with a single flange on the side corresponding to the tape edge to be aligned.

Figure 4:
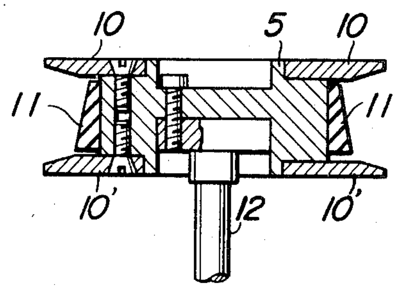
FIGS. 4 and 5 illustrate modifications of the mechanism or FIG. 2.
Figure 5:
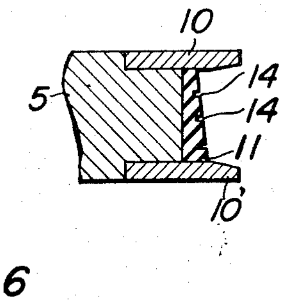

FIGS. 4 and 5 show modifications of the above embodiment.

In the FIG. 4 modification, the opposite edges of the resilient ring 11 are slightly spaced from the respective flanges 10 and 10', so as to have readier elastic deformation of the ring.

In the FIG. 5 modification, the resilient ring 11 is formed with a plurality of annular peripheral grooves 14 to the same end.

As has been shown, according to the invention the regulation of the transversal tape position of the two overlapping tapes relative to each other is achieved just before the tapes are taken up by the sole provision of a tapered resilient ring to the rotary guide roller or capstan. Further, the aforementioned pressure gradient may also be obtained by such means as varying the thickness or hardness of the rubber layer in the transversal direction.

The arrangement for regulating the transversal taoe position according to the invention may also incorporate a mechanism to adjust the orientation of the shaft of either take-up reel 6 or tape drive capstan 5 with respect to three perpendicular axes X, Y and Z.

Figure 6:
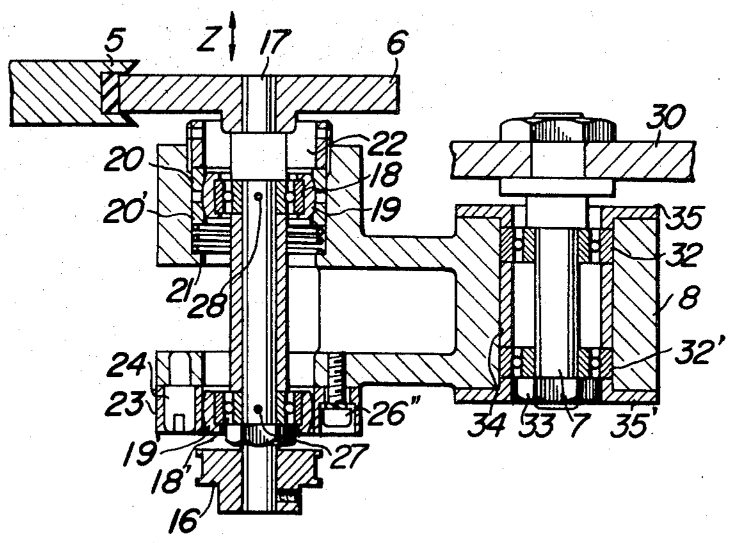
FIG. 6 is a sectional view showing a second embodiment of the invention.
Figure 7:
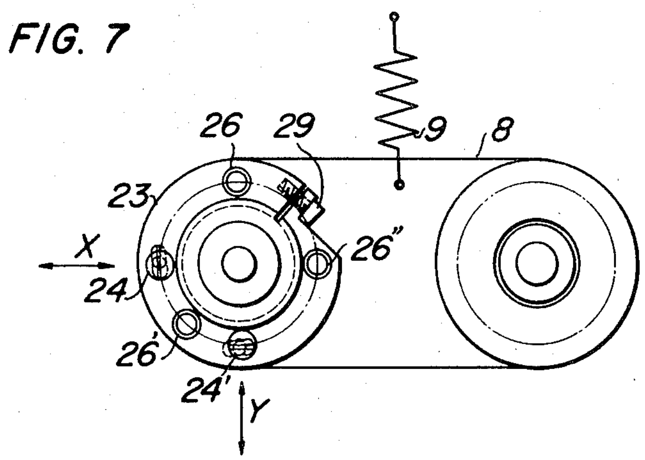
FIG. 7 is a plan view showing the embodiment of FIG. 6.

FIGS. 6 and 7 show another embodiment of the invention, which includes the above adjusting mechanism for adjusting the shaft of the take-up reel 6. Referring to these Figures, numeral 17 designates a shaft pressure fitted in the take-up reel 6 and journalled in bearings 18 and 18' spaced a predetermined distance from each other. It is driven through a pulley 16 secured to it. The bearings 18 and 18' are pressure fitted in respective housings 19 and 19' having a partly spherical contour. The bearing housing 19 is clamped between complementarily shaped resilient rings 20 and 20', which are in turn axially movable and are adjusted to a predetermined position by a spring 21 and a threaded ring 22. The bearing housing 19' is slidably fitted in a fixed annular member 23, which is formed with a peripheral notch, as shown in FIG. 7. The top of the annular member 23 is provided with excentric cams 24 and 24' lying on respective diametrical axes X and Y perpendicular to each other. These cams 24 and 24' are received in respective holes formed in the arm 8. By slightly loosening bolts 26, 26' and 26'', and by rotating the cam 24 the center 27 of the bearing 18' may be shifted in the direction X with respect to the center 28 of the bearing 18. Likewise, by rotating the cam 24' the point 27 may be shifted in the direction Y. The bearing housing 19' is secured to the annular member 23 by bolt 29. The annular member 23 is in turn secured to the arm 8 by fastening the bolts 26, 26' and 26''.

The arm 8 is pivoted to a base 30 by a pivotal support pin 7 vertically extending from the base. Bearings 32 and 32' fitted on the support pin 7 are fixed against axial movement by collar 34 and nut 33. The movement of the arm 8 in the same direction is also restricted by members 35 and 35'. The take-up reel 6 is always urged against the periphery of the capstan 5 by the bias force of a spring 9 anchored at one end to the arm 8 pivoted on the support pin 7. A transfer field provided from a field source is impressed on the roll of tapes taken up on the take-up reel 6.

with this construction, to adjust the condition for the forced contact between capstan 5 and take-up reel 6, for instance, dial gauges (not shown) provided at four positions of a member secured to the top of the capstan may be set with respect to the plane of the top of the take-up reel, and the afore-mentioned adjustment may be done by reading the dial gauge pointers. In this manner, uniform pressure distribution or a predetermined pressure gradient in the transversal direction of the contact area of the tapes may be obtained.

Also, where a predetermined pressure gradient is used, the tapes may be aligned with respect to their edges subjected to higher pressure. In this case, both the tapes may be either flush or in shear on the capstan periphery. Furthermore, it has been confirmed that a parallel degree of above one minute may be achieved by the above adjusting method. Thus, according to the invention it is possible to take up a plurality of tapes concurrently with the lower edges thereof aligned without resulting in any transversal shear thereof.

While in the preceding embodiment the adjusting mechanism is provided to the take-up reel shaft 17, it will be apparent that the adjusting mechanism may as well be realized in the shaft 12 of the tape drive capstan 5 or the pivotal pin 7 co-operating with the take-up reel 6.

FIG. 8a shows a further embodiment of the invention. Referring to the Figure, numeral 5 designates the guide roller provided with upper and lower flanges 10 and 10' spaced from each other by a distance slightly greater than the width of master and slave tapes 3 and 4. Provided within the groove defined by both the flanges is a resilient ring of such material as rubber or synthetic resin. While the resilient ring 11 is in close contact with the upper flange 10, it is spaced from the lower flange 10' by a gap *d*. Numeral 12 designates a drive shaft of the capstan 5, and it is driven from a drive source as motor. The tapes 3 and 4 are driven by virtue of the forced contact between the capstan 5 and the roll of tapes wound on the take-up reel 6, whereby they are taken up on the take-up reel 6.

With the above construction, as the overlapping tapes being taken up are pressed against the resilient ring 11 fitted on the capstan 5, the resilient ring 11 tends to be deformed. Since the resilient ring 11 is in contact with the upper flange 10, its deformation is taken up in the gap *d* between the lower flange 10' and the resilient ring 11.

The deformed form of the resilient ring 11 is shown in FIG. 9.

Since the master tape 3 is pressed against the resilient ring 11 and both the master and slave tapes 3 and 4 are brought into close contact, both the tapes are shifted toward the lower flange in accordance with the deformation of the resilient ring 11. By adjusting the extent of deformation of the resilient ring 11 such that the lower edges of the tapes are brought into contact with the lower flange 10', the transversal position of the tapes is regulated by the lower flange 10'. The gap *d* is adjusted to an optimum value by the modulus of transverse elasticity of the resilient ring 11, urging force of the reel 6 and other factors.

As shown in FIG. 8*b*, the adjustment of the gap *d* may be readily achieved by inserting a thin spacer between the capstan body 5' and flange 10'.

By way of example, it is experimentally shown that with $d = 0.08$ inch (about 0.2 mm) and the contact pressure set to about 6 lbs to 12 lbs (about 2.7 kg to 5.5 kg), the shear between the lower edges of both the tapes is about 2 mils to 5 mils (about 50 microns to 130 microns), which is very satisfactory.

As has been shown, the regulation of the transversal position of both the tapes just before the tapes are taken up is achieved by the sole provision of a resilient ring spaced a predetermined gap from the lower flange of the tape drive capstan. With this means, it is possible to take up both the tapes on the take-up reel with the lower edges of the tapes aligned. Also, excellent close contact between both the tapes is obtained by virtue of the resiliency of the resilient ring.

FIG. 10 shows a fourth embodiment of the invention. In this embodiment, tape lower edge position regulating means 31 and 31' are provided in the vicinity of the capstan 5. The master tape 3 is given a transversally downward force by the regulating means 31 as the tape is guided therepast toward the gap between the capstan 5 and a tape guide 36.

As shown in FIG. 11, the capstan 5 is provided with upper and lower flanges 10 and 10', and the master tape 3 experiencing the afore-mentioned transversally downward force engages the capstan flange 10' as it reaches the capstan, so that its transversal position is regulated with respect to the top surface of the flange 10'. Similarly, the slave tape 4 is given transversally downward force by the regulating means 31' as it is guided therepast toward the gap between the capstan 5 and the tape guide 36. Thus, the lower edges of the master and slave tapes 3 and 4 are regulated into alignment by the capstan flange 10', so that both the tapes are taken up on the take-up reel 6 with their lower edges in alignment.

FIG. 12 shows an example of the tape lower edge position regulating means 31 or 31'. It comprises a block 37 carrying a post 38, past which the tape 3 or 4 is guided. The block 37 is rotatable about a pin 39 and is held in a predetermined position by fastening a bolt penetrating the block 37 and a guide support 41.

The level of the master and slave tapes 3 and 4 proceeding from their respective reels 1 and 2 do not always coincide at the entrance to the capstan 5 due to errors in the attachement of component parts, difference in width of both tapes, fluctuations of the tape tension and other factors. With the tape lower edge position regulating means 31 and 31' the master and slave tapes 3 and 4 are independently regulated with respect to their transversal position. Of course, the tolerance here is of a very small value of the order of 5 to 10 microns.

Referring to FIGS. 12 and 14, which show the tape lower edge position regulating means 31 and 31', the angle $\theta$ of the block 37 is adjusted to an optimum value by loosening the bolt 42 and rotating the block about the pin 39 in a direction to increase or decrease the angle. When the block is set to the intended position, the bolt 42 is re-fastened to fix the block in that position. Experiments reveal that if the angle $\theta$ is too small, the tape proceeds with the lower edge folded.

While it is possible to use a rotary post as the post 38 to reduce the frictional resistance between the tape and the post, in such case an extremely strict precision is required for the rotation of the post. The post 38 need not extent perpendicular to the direction of travel of the tape.

As has been described, with this embodiment the proceeding master and slave tapes are guided to the capstan having at least one flange past respective guide posts, whose angle can be freely adjustable, so that the transversal tape position may be regulated by downwardly tilting the tape through the post so as to bring the lower tape edge into engagement with the capstan flange. Thus, a predetermined positional regulation may be obtained with a simple construction and without the necessity of increasing the precision for the assemblage of the entire system.

FIG. 13 shows a still further embodiment of the invention, which may incorporate the tape lower edge position regulating means in the preceding embodiment. In this embodiment, the capstan or rotary guide roller having at least a lower flange is always urged upwards so that the bottom of the take-up reel is rendered flush with the top of the lower flange of the capstan, whereby the lower edges of the master and slave tapes 3 and 4 may be aligned.

The capstan 5 has upper and lower flanges 10 and 10' for the regulation of the transversal tape position. The periphery of the capstan 5 is fitted with a resilient ring 11 to ensure excellent close contact between the two tapes. The shaft of the capstan 5 is supported in bearings 44 and 44' and is driven through a pulley 45 secured to it. Thus, the capstan 5, shaft 12 and pulley 45 are integrated, and the total weight is supported on the bearing 44 through spring plate 46 and fit ring 47. The upward movement of the bearing 44 is restricted by a nearing retainer 48. The take-up reel 6 is rotatably mounted on an arm 8, which is pivoted on a pin 7 and biased with a spring 9 such that the tape roll on the take-up reel 6 is always urged against the capstan 5. The bottom of the take-up reel 6 is held in forced contact with the lower flange 10' of the capstan 5 to downwardly urge the capstan 5 against the force of the spring 46.

With the above construction, with a constant downward pressure transmitted from the take-up reel 6 to the capstan flange 10', the capstan 5 presses the bearing 44 and is held in balance with the deformation of the spring 46. In other words, with the downward movement of the capstan 5 the bearings 44 and 44' move in unison with the shaft 12 within the bearing box 49. Thus, the bottom of the take-up reel 6 and the top of the lower flange of the capstan 5 are always held flush.

Thus, it is possible to take up both the tapes with their lower edges aligned, so that copy tapes of excellent interchangeability may be obtained.

As has been described in the foregoing, according to the invention it is possible to obtain excellent alignment of the lower edges of the master and slave tapes (with a precision degree of about 5 to 10 microns).

We claim:

1. In a magnetic tape duplicating system wherein a master tape carrying recorded information and a slave tape are taken up on the same take-up reel with the magnetic faces of said tapes in contact for impressing a transfer field on said taken up tapes, apparatus for taking up said tapes on said take-up reel, comprising:

a tape drive member against a portion of the periphery of which said tapes are passed, said tape drive member having a flange;

a resilient ring disposed on the periphery of said drive member, said ring having a taper such that the circumference of said ring increases in the direction toward said flange;

a flangeless take-up reel; and means urging said take-up reel against said peripheral resilient ring to develop a pressure gradient in the direction of said flange, said gradient acting on said master and slave tapes wound at least partially around said drive member to urge respective edge portions of said tapes against said flange.

2. The take-up apparatus according to claim 1, wherein said resilient ring is spaced a predetermined distance away from said flange on the periphery of said drive member.

3. The take-up apparatus according to claim 1, further comprising a plurality of annular peripheral grooves formed in said resilient ring.

4. The take-up apparatus according to claim 1, wherein said take-up reel and drive member are mounted on shafts each supported by bearings; further comprising means adjustably mounting one of said bearings for axial movement; and means adjustably mounting another of said bearings for movement in two radially mutually perpendicular directions with respect to the center of said one bearing, wherein said drive member and take-up reel are adjustable relative to each other.

5. In a magnetic tape duplicating system wherein a master tape carrying recorded information and a slave tape are taken up on the same take-up reel with the magnetic faces of said tapes in contact for impressing a transfer field on said taken up tapes, apparatus for taking up said tapes on said take-up reel, comprising:

a tape drive member against a portion of the periphery of which said tapes are passed, said tape drive member having a flange;

a resilient ring disposed on the periphery of said drive member, said ring being spaced a predetermined distance away from said flange on the periphery of said drive member;

a flangeless take-up reel; and means urging said take-up reel against said peripheral resilient ring to develop a pressure gradient in the direction of said flange, said gradient acting on said master and slave tapes wound at least partially around said drive member to urge respective edge portions of said tapes against said flange.

6. The take-up device according to claim 5, further comprising a spacer member inserted between said drive member and said flange for adjusting the spacing between said peripheral ring and said flange.

7. The take-up apparatus according to claim 5, wherein said take-up reel and drive member are mounted on shafts each supported by bearings; further comprising means adjustably mounting one of said bearings for axial movement; and means adjustably mounting another of said bearings for movement in two radially mutually perpendicular directions with respect to the center of said one bearing, wherein said drive member and take-up reel are adjustable relative to each other.

8. In a magnetic tape duplicating system wherein a master tape carrying recorded information and a slave tape are taken up on the same take-up reel with the magnetic faces of said tapes in contact for impressing a transfer field on said taken up tapes, apparatus for taking up said tapes on said take-up reel, comprising:

a tape drive member against a portion of the periphery of which said tapes are passed, said tape drive member having a flange, said drive member being mounted on a shaft supported by bearings;

a resilient ring disposed on the periphery of said drive member;

a flangeless take-up reel mounted on a shaft supported by bearings;

means adjustably mounting one of said bearings for axial movement;

means adjustably mounting another of said bearings for movement in two radially mutually perpendicular directions with respect to the center of said one baring, wherein said drive member and take-up reel are adjustable relative to each other; and means urging said take-up reel against said peripheral resilient ring to develop a pressure gradient in the direction of said flange, said gradient acting on said master and slave tapes wound at least partially around said drive member to urge respective edge portions of said tapes against said flange.

9. In a magnetic tape duplicating system wherein a master tape carrying recorded information and a slave tape are taken up on the same take-up reel with the magnetic faces of said tapes in contact for impressing a transfer field on said taken up tapes, apparatus for taking up said tapes on said take-up reel, comprising:

a base member;

a tape drive member, against a portion of the periphery of which said tapes are passed, having a shaft resiliently mounted on said base member for axial movement, said tape drive member having a flange;

a resilient ring disposed on the periphery of said drive member;

a flangeless take-up reel;

means urging said take-up reel against said peripheral resilient ring to develop a pressure gradient in the direction of said flange, said gradient acting on said master and slave tapes wound at least partially around said drive member to urge respective edge portions of said tapes against said flange, said urging means urging said take-up reel against said flange and against the resilient mounting of said shaft;

guide members mounted on said base member, said master and slave tapes being guided past respective ones of said guide members prior to said tapes contacting said drive member; and means for adjusting the angles of said guide members relative to said base for urging respective edge portions of said master and slave tapes into contact with said flange.

* * * * *